(12) United States Patent
Suemitsu et al.

(10) Patent No.: US 11,112,536 B2
(45) Date of Patent: Sep. 7, 2021

(54) THERMAL EMISSION SOURCE

(71) Applicants: Osaka Gas Co., Ltd., Osaka (JP); Kyoto University, Kyoto (JP)

(72) Inventors: Masahiro Suemitsu, Osaka (JP); Tadashi Saito, Osaka (JP); Susumu Noda, Kyoto (JP); Takashi Asano, Kyoto (JP); Menaka De Zoysa, Kyoto (JP)

(73) Assignees: Osaka Gas Co., Ltd., Osaka (JP); Kyoto University, Kyoto (JP)

( * ) Notice: Subject to any disclaimer, the term of this patent is extended or adjusted under 35 U.S.C. 154(b) by 282 days.

(21) Appl. No.: 16/080,789

(22) PCT Filed: Feb. 28, 2017

(86) PCT No.: PCT/JP2017/007760
§ 371 (c)(1),
(2) Date: Aug. 29, 2018

(87) PCT Pub. No.: WO2017/150523
PCT Pub. Date: Sep. 8, 2017

(65) Prior Publication Data
US 2019/0064393 A1 Feb. 28, 2019

(30) Foreign Application Priority Data
Mar. 1, 2016 (JP) .............................. JP2016-039217

(51) Int. Cl.
*G02B 1/00* (2006.01)
*H01K 11/00* (2006.01)
(Continued)

(52) U.S. Cl.
CPC .............. *G02B 1/005* (2013.01); *F28F 13/18* (2013.01); *H01K 1/14* (2013.01); *H01K 11/00* (2013.01);
(Continued)

(58) Field of Classification Search
CPC .............. F28D 2021/0029; F28F 13/18; F28F 2245/06; G02B 1/005; H01K 11/00; H01K 1/04; H01K 1/14; H01K 3/02
See application file for complete search history.

(56) References Cited

U.S. PATENT DOCUMENTS

2009/0127478 A1 5/2009 Inoue et al.
2016/0049897 A1* 2/2016 Noda et al. ............. H02S 10/30

FOREIGN PATENT DOCUMENTS

CN 105027428 A 11/2015
JP 2014216132 A 11/2014
(Continued)

*Primary Examiner* — Joseph P Martinez
*Assistant Examiner* — Vipin Patel
(74) *Attorney, Agent, or Firm* — The Webb Law Firm

(57) ABSTRACT

A thermal emission source is provided that has a structure capable of suppressing deterioration of an optical assembly over time. The thermal emission source includes an optical assembly (1) having an optical structure in which a member made of a semiconductor has a refractive index distribution so as to resonate with light of a wavelength shorter than a wavelength that corresponds to an absorption edge corresponding to a band gap of the semiconductor. The optical assembly (1) includes a coating structure (30) with a coating material that differs from the semiconductor of refractive portions (10) and through which light of a wavelength included in a wavelength range from visible light to far infrared rays can be transmitted.

10 Claims, 5 Drawing Sheets

(51) Int. Cl.
 *H01K 1/14* (2006.01)
 *F28F 13/18* (2006.01)
 *F28D 21/00* (2006.01)

(52) U.S. Cl.
 CPC .. *F28D 2021/0029* (2013.01); *F28F 2245/06* (2013.01)

(56) References Cited

FOREIGN PATENT DOCUMENTS

| | | |
|---|---|---|
| JP | 201542055 A | 3/2015 |
| WO | 2007139022 A1 | 12/2007 |
| WO | 2014136671 A1 | 9/2014 |

* cited by examiner

THERMAL EMISSION SOURCE

CROSS-REFERENCE TO RELATED APPLICATIONS

This application is the United States national phase of International Application No. PCT/JP2017/007760 filed Feb. 28, 2017, and claims priority to Japanese Patent Application No. 2016-039217 filed Mar. 1, 2016, the disclosures of which are hereby incorporated in their entirety by reference.

TECHNICAL FIELD

The present invention relates to a thermal emission source that includes an optical assembly with an optical structure in which a member that is made of a semiconductor has a refractive index distribution so as to resonate with light of a wavelength shorter than a wavelength that corresponds to the absorption edge corresponding to the band gap of the semiconductor.

BACKGROUND ART

In general, heating an object causes thermal emission which is emission of light (electromagnetic waves) with a spectrum that depends on substances constituting the object and the temperature of the object. Usually, in thermal emission, light that has a wavelength distribution in which the intensity ranges over a wide wavelength range is emitted.

In recent years, there has been a demand for a thermal emission source that emits light that has a large intensity in a specific wavelength range, rather than light that has such a wide wavelength distribution as that mentioned above.

Demand of such a thermal emission source can be found, for example, in the field of solar cells and high-efficient sensing light sources.

For example, in the field of solar cells, only light in a specific wavelength region in a wide wavelength band included in that of sunlight contributes to photoelectric conversion, and the energy of light of other wavelengths is wasted.

It has been proposed that thermal energy is converted to emission light in a specific wavelength region for use in high-efficient power generation technology, using a thermal emission source that uses a photonic crystal structure including an optical assembly that is made of a semiconductor, the optical assembly having an optical structure in which a refractive index distribution is formed so as to resonate with light of a wavelength shorter than a wavelength that corresponds to the absorption edge corresponding to the band gap of the semiconductor, the optical structure being asymmetrical in a direction in which the emission light is to be emitted (Patent Document 1).

With such a thermal emission source using a semiconductor, when heat is externally supplied to the thermal emission source, energy is absorbed by the semiconductor, causing thermal excitation of electrons from the valance band to the conduction band across the band gap. Such absorption is called "interband absorption". Then, as a result of the transition of the excited electrons to the valance band across the band gap, emission light is produced. The emission light of this semiconductor has higher energy than that of the band gap and thus has wavelengths that are shorter than the wavelength corresponding to the energy of the band gap. That is to say, in the wavelength distribution of the light emitted from the semiconductor due to interband absorption, the intensity of light of wavelengths shorter than the wavelength (hereinafter referred to as "cutoff wavelength") that corresponds to the energy of the band gap at a heating temperature is larger.

Also, such a thermal emission source using an optical assembly, such as a photonic crystal structure in which a refractive index distribution is formed so as to resonate with light in a specific wavelength region, amplifies light in the specific wavelength region by means of resonance with the light, and obtains the light in this specific wavelength region as emission light. Of parameters that determine the resonance and resonant wavelength, the physical shape of the optical assembly and the effective refractive index that depends on the volume thereof are dominant.

PRIOR ART DOCUMENTS

Patent Documents

Patent Document 1: WO 2014/136671

DISCLOSURE OF THE INVENTION

Problem to be Solved by the Invention

The above-described thermal emission source is used at a high temperature of 1000° C. or higher, for example. Accordingly, the optical assembly that is made of a semiconductor in the thermal emission source will deteriorate over time.

For this reason, there is a demand for a thermal emission source with a structure capable of suppressing deterioration of the optical assembly over time.

The present invention has been made in view of the foregoing situation, and aims to provide a thermal emission source with a structure capable of suppressing deterioration of an optical assembly over time, while keeping a wavelength distribution of emission light.

Means for Solving Problem

A thermal emission source according the present invention for achieving the above object is a thermal emission source including:

an optical assembly having an optical structure in which a member made of a semiconductor has a refractive index distribution so as to resonate with light of a wavelength shorter than a wavelength that corresponds to an absorption edge corresponding to a band gap of the semiconductor, wherein the optical assembly includes a coating structure for coating the member made of the semiconductor with a coating material through which light of a wavelength included in a wavelength range from visible light to far infrared rays can be transmitted.

With the above configuration, light of a wavelength included in a wavelength range from visible light to far infrared rays can be transmitted through the coating material. Thus, in a case where the member made of the semiconductor of the optical assembly is coated by the coating material, this thermal emission source does not absorb light of wavelengths included in the wavelength range from visible light to far infrared rays, and the thermal emission function is not impaired.

Furthermore, the coating structure that is made of this coating material does not absorb light of a specific wavelength included in the wavelength range from visible light to far infrared rays, and furthermore, light of wavelengths included in the wavelength range from visible light to far infrared rays is not emitted from the coating structure. Thus, a sharp wavelength distribution of emission light can be kept.

That is to say, the coating material can coat the member made of the semiconductor without impairing the thermal emission function of the thermal emission source.

Since the coating material thus coats the member made of the semiconductor of the optical assembly and protects the member made of the semiconductor to isolate it from the outside, oxidation of the semiconductor in the optical assembly can be suppressed. For example, oxidation can be suppressed even at a temperature of 1000° C. or higher.

Also, since the coating material thus coats the member made of the semiconductor of the optical assembly and protects the member made of the semiconductor to reinforce it, durability can be increased against physical stress deriving from thermal expansion and thermal shrinkage due to heat generation and cooling of the optical assembly.

Accordingly, deterioration of the optical assembly over time can be suppressed.

A further characteristic configuration of the thermal emission source according to the present invention lies in that an infrared absorptivity of the coating structure is 0.1% or lower.

The above configuration can suppress deterioration of the optical assembly over time while keeping the emission efficiency of the thermal emission source in an infrared range.

A further characteristic configuration of the thermal emission source according to the present invention lies in that the coating material is an insulator.

If the coating material is a non-insulator, and the member made of the semiconductor of the optical assembly is coated by this coating material, free electrons in the entire optical assembly including the coating structure increase. In this case, these free electrons serve as intrinsic carriers, and induce free electron (free carrier) absorption. Then, emission (i.e. background emission) increases in a wide area in a longer wavelength region than the wavelength that corresponds to the absorption edge corresponding to the semiconductor band gap, and long-wavelength components of the emission light of the thermal emission source broaden.

However, with the above configuration, even in the case where the member made of the semiconductor of the optical assembly is coated by the coating material that is made of an insulator, an increase in free electrons in the optical assembly is suppressed compared with the case of coating the member made of the semiconductor with a non-insulator. For this reason, it is possible to suppress free carrier absorption, and keep the wavelength distribution of emission light of the thermal emission source as a sharp, narrow-band wavelength distribution with which the amount of emission is small in a wide area of a longer wavelength region than the wavelength that corresponds to the absorption edge corresponding to the semiconductor band gap. Moreover, a sharp wavelength distribution of emission light makes it possible to prevent supplied thermal energy from being consumed due to emission in a long wavelength region, and to efficiently convert the supplied thermal energy to emission light of a desired peak wavelength.

In a case where the member made of the semiconductor of the optical assembly is coated by the coating material, the peak wavelength shifts toward the long-wavelength side in accordance with the coating amount. In this case, if the peak wavelength is to be kept in accordance with the coating amount, the mass or volume of the member made of the semiconductor of the optical assembly may be reduced in accordance with the coating amount.

A further characteristic configuration of the thermal emission source according to the present invention lies in that the optical assembly has a photonic crystal structure in which a refractive portion that is formed with the member is arranged on an optical substrate whose optical refractive index is smaller than that of the semiconductor.

With this configuration, standing waves of a wavelength that corresponds to the size of the refractive portion are formed within the refractive portion. Accordingly, thermal emission light can be emitted with a large intensity from the refractive portion in a direction in which the refractive portion is arranged in the optical substrate. Since the refractive portion is coated by the coating material, it is possible to prevent deterioration of the refractive portion over time, and suppress deterioration of the optical assembly over time while keeping the emission efficiency of the thermal emission source.

A further characteristic configuration of the thermal emission source according to the present invention lies in that light of a wavelength included in a wavelength range from visible light to far infrared rays can be transmitted through the optical substrate.

This configuration makes it possible to avoid light absorption of the optical substrate, and to keep a high emission efficiency of the thermal emission source.

A further characteristic configuration of the thermal emission source according to the present invention lies in that an optical refractive index of the coating material is higher than the optical refractive index of the optical substrate.

With the above configuration, the refractive portion coated by the coating material serves as an integrated different refractive index region with a size including the refractive portion and the coating material, with respect to the optical substrate. Then, standing waves of a wavelength that corresponds to the size of the region including the refractive portion and the coating material are formed.

That is to say, the peak wavelength of the emission light of the emission source can be changed with the thickness of the coating of the coating material. The peak wavelength of emission light refers to a wavelength with the largest radiation intensity in the wavelength region of the wavelength distribution of emission light.

A further characteristic configuration of the thermal emission source according to the present invention lies in that the optical assembly includes a coating structure for coating the optical substrate with a coating material through which light of a wavelength included in a wavelength range from visible light to far infrared rays can be transmitted.

The above configuration can suppress deterioration of the optical substrate over time, and thus can deterioration of the optical assembly formed on the optical substrate over time.

A further characteristic configuration of the thermal emission source according to the present invention lies in that the coating structure is a multi-layer structure including coating materials having different optical refractive indexes.

The above configuration can further suppress deterioration of the optical assembly over time through multi-layer coating using different types of coating materials with different optical refractive indexes. Specifically, a material that fits better to the semiconductor in the optical assembly can be used as the coating material of the inner layer in the multi-layer structure, and a material resistant to heat and stress can be used as the coating material of the surface layer. In this case, the coating structure can more stably protect the member made of the semiconductor from heat and stress than in the case of a single-layer structure, while suppressing peeling on the interface between the semiconductor and the coating material.

A further characteristic configuration of the thermal emission source according to the present invention lies in that the coating material has a melting point higher than the melting point of the semiconductor.

With this above configuration, the semiconductor in the optical assembly is coated by a material with a high melting point that is more resistant to heat and stress than the semiconductor in the optical assembly, and thus, the member made of the semiconductor can be stably protected from heat and stress. Also, oxidation of the semiconductor can be suppressed.

A further characteristic configuration of the thermal emission source according to the present invention lies in that the semiconductor is Si, and a peak wavelength of emission light is 1800 nm or shorter.

A further characteristic configuration of the thermal emission source according to the present invention lies in that the semiconductor is SiC, and a peak wavelength of emission light is 1100 nm or shorter.

In the thermal emission source according to the present invention, if the peak wavelength of emission light is too close to the cutoff wavelength, the portion on the long-wavelength side of the wavelength distribution of the thermal emission light is cut off. Accordingly, it is desirable that the peak wavelength of emission light does not greatly exceed the cutoff wavelength.

Particularly, in the case of using Si (silicon) or SiC (silicon carbide) as the semiconductor, the cutoff wavelength of Si and 3C—SiC (SiC that has a cubic structure called "3C") are approximately 1700 nm and 800 nm, respectively, in a usual use environment.

Accordingly, the above configuration enables emission light to be taken out from the thermal emission source with practical efficiency, while keeping practical emission efficiency.

BEST MODE FOR CARRYING OUT THE INVENTION

A thermal emission source according to an embodiment of the present invention will be described with reference to FIGS. 1 to 10.

First, a description will be given, with reference to FIG. 1, of a schematic configuration of a thermal emission source 100 according to this embodiment that includes an optical assembly 1 with an optical structure in which a member that is made of a semiconductor has a refractive index so as to resonate with light of wavelengths shorter than a wavelength that corresponds to the absorption edge corresponding to the band gap of this semiconductor.

Figure 1:
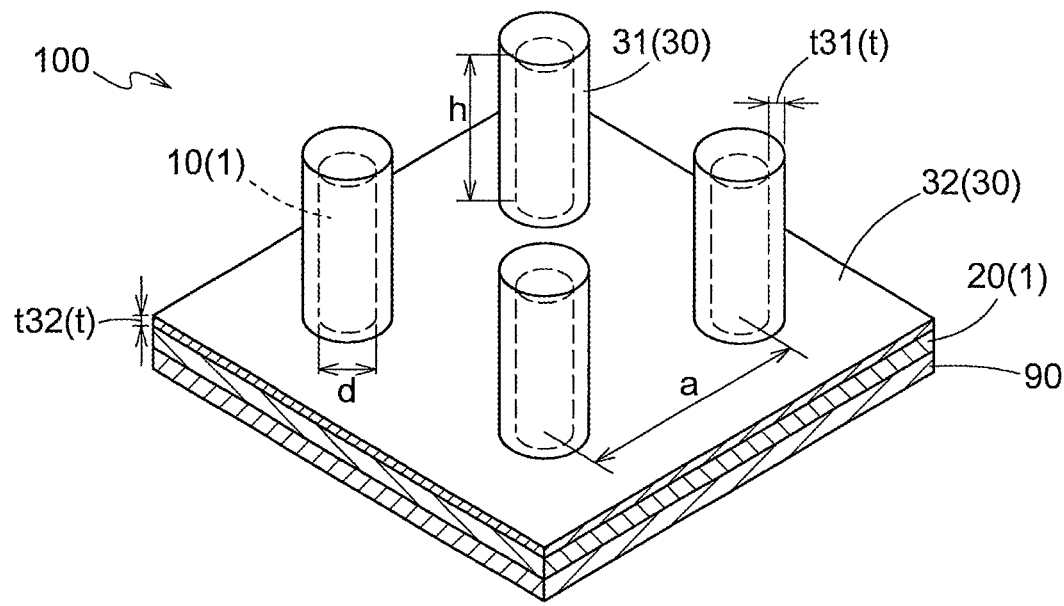
FIG. 1 shows a structure of a thermal emission source.

The thermal emission source 100 in FIG. 1 has the optical assembly 1 that includes refractive portions 10, each of which is the member that is made of the semiconductor, and an optical substrate 20 whose optical refractive index is lower than that of the semiconductor of the refractive portions 10. The thermal emission source 100 in this example also includes a heat conductive member 90 that receives energy from the outside.

This optical assembly 1 has an asymmetric optical structure in which the refractive portions 10 are arranged in a square grid on a face in the direction in which emission light of the optical substrate 20, which has a flat plate shape, is to be emitted. Accordingly, the face in which the refractive portions 10 are provided is oriented in a direction in which emission light is to be emitted. Note that the arrangement of the refractive portions 10 is not limited to a square grid arrangement.

This optical structure of the optical assembly 1 is also called a photonic crystal structure.

The heat conductive member 90 is arranged so as to be able to conduct heat, on the other face of the optical substrate 20.

Accordingly, this thermal emission source 100 has a function of converting, using the optical assembly 1, thermal energy supplied via the heat conductive member 90 to emission light including a wavelength that corresponds to the optical structure of the optical assembly 1.

The optical assembly 1 may include the refractive portions 10, the optical substrate 20, and other functional portions. The optical assembly 1 in this example includes a coating structure 30, which is made of a material other than the semiconductor of the refractive portions 10 and is made of a coating material through which light of wavelengths included in a wavelength range from visible light to far infrared rays can be transmitted. The coating structure 30 is one of the other functional portions. In this application, wavelengths included in the wavelength range from visible light to far infrared rays refer to wavelengths in a range at least from 1100 to 5000 nm, preferably from 750 to 10000 nm, and more preferably from 500 to 10000 nm.

Accordingly, the optical assembly 1 forms one optical structure including the refractive portions 10, the optical substrate 20, and the coating structure 30.

The structure of each portion will be described below in detail.

When the material or the like of each portion is described, a case where the material has a crystal structure will be described unless stated otherwise. The coating structure 30 according to the present invention is not limited to the case where the material has a crystal structure but may also include a case where the material is amorphous, whereas the coating structure 30 according to the present invention is has higher durability and is thus preferable when the material has a crystal structure.

The refractive portions 10 are included in the member that is made of a semiconductor. The semiconductor includes an intrinsic semiconductor.

In this example, the refractive portions 10 are made of Si crystals.

In addition to Si crystals, SiC can be also favorably used as the semiconductor to be used in the refractive portions 10. Si and SiC are intrinsic semiconductors.

In this example, the aforementioned wavelengths refer to a wavelength with the highest emission intensity in a wavelength region of 3000 nm or shorter in the wavelength distribution of emission light.

The cutoff wavelength of Si is approximately 1700 nm. Accordingly, in a case of using Si in the refractive portions 10, it is favorable to determine the optical structure of the optical assembly 1 so that the peak wavelength of emission light is 1800 nm or shorter.

The cutoff wavelength of SiC is approximately 800 nm. Accordingly, in a case of using SiC in the refractive portions 10, it is favorable to determine the optical structure of the optical assembly 1 so that the peak wavelength of emission light is 1100 nm or shorter, with respect to the cutoff wavelength.

In this example, the refractive portions 10 are formed to have a columnar shape in a state of protruding on the optical substrate 20. This example describes a case where the optical assembly 1 has a single-layer structure including the refractive portions 10 on one optical substrate 20.

In an example, the diameter d of each refractive portion 10 is approximately 200 nm. The height h of the refractive portions 10 is approximately 500 nm. The refractive portions 10 are arranged in a square grid, and the period length a (the distance between the centers of adjacent rods) in the square grid is approximately 600 nm.

The optical substrate 20 is a substrate through which light of wavelengths included in the wavelength range from visible light to far infrared rays can be transmitted. In other words, the optical substrate 20 does not have an absorptivity in the wavelength range from visible light to far infrared rays. In this example, this optical substrate 20 is formed on a flat plate.

The optical substrate 20 is made of a material through which light of wavelengths included in the wavelength range from visible light to far infrared rays can be transmitted. In this example, the optical substrate 20 is made of $SiO_2$ (silicon dioxide) with a thickness of 1 µm.

Favorable materials through which light of wavelengths included in the wavelength range from visible light to far infrared rays can be transmitted and that can be used in the optical substrate 20 include $SiO_2$, $HfO_2$ (hafnium oxide), MgO (magnesium oxide), $Al_2O_3$ (aluminum oxide, sapphire), $Y_2O_3$ (yttrium oxide), $CaF_2$ (calcium fluoride), $BaF_2$ (barium fluoride), and so on, for example.

The coating structure 30 is a member for coating at least the surface of each refractive portion 10. In this example, the refractive portion 10 and the optical substrate 20 are coated by an integrated coating structure 30, which is made of a single-layer coating material. That is to say, in this example, the coating structure 30 is a coating that coats the surface of the refractive portions 10.

In this example, the coating structure 30 includes a coating portion 31, which serves as a member for coating the refractive portions 10, and a coating portion 32, which serves as a member for coating the optical substrate 20.

The coating structure 30 is made of a coating material through which light of wavelengths that are included in the wavelength range from visible light to far infrared rays can be transmitted. This is to enable emission light to be emitted from the optical assembly 1.

To enable emission light to be emitted, the coating material to form the coating structure 30 may be an infrared-transmissive material whose infrared absorptivity is 0.1% or lower. The infrared absorptivity refers to a value at room temperature (25° C.). It is favorable that the coating structure 30, when in a coating state, has the infrared absorptivity in a wavelength range from 1100 to 7000 nm, and more preferably from 500 to 10000 nm.

In this example, the coating structure 30 is made of $HfO_2$. $HfO_2$ has an absorptivity of 0.1% or lower for light of wavelengths in the wavelength range from 500 to 10000 nm, and is thus a favorable infrared-transmissive material.

It is favorable that the optical refractive index of the coating material that forms the coating structure 30 is larger than the optical refractive index of the material that forms the optical substrate 20.

In this example, the optical refractive index of $HfO_2$ that forms the coating structure 30 is 1.91, which is larger than the optical refractive index of $SiO_2$ that forms the optical substrate 20, that is, 1.46.

It is favorable that the coating material that forms the coating structure 30 is an insulator.

In this example, $HfO_2$ that forms the coating structure 30 is an insulator.

If the coating material that forms the coating structure 30 is an oxide, it is favorable that the standard Gibbs energy of the element before this oxide is oxidized (that is to say, the element is obtained by reducing this oxide) is equal to or smaller than the standard Gibbs energy of the semiconductor. More favorably, the standard Gibbs energy of the element obtained by reducing this oxide is smaller than the standard Gibbs energy of the semiconductor. In this example, the standard Gibbs energy of the oxide in a temperature range from 0° C. to 1500° C. is used.

This choice of the coating material makes it possible to suppress oxidation of the semiconductor, and suppress deterioration of the optical assembly 1 over time.

It is favorable that the melting point of the coating material that forms the coating structure 30 is 1200° C. or higher.

In this example, the melting point of $HfO_2$ that forms the coating structure 30 is 2758° C.

Accordingly, the melting point of the coating material in this example is higher than 1414° C., which is the melting point of Si, that is, the semiconductor.

Examples of other materials that are favorable as the coating material to form the coating structure 30 include $SiO_2$, $HfO_2$, MgO, $Al_2O_3$, $Y_2O_3$, and $CaF_2$.

When in the coating state, these materials have an absorptivity of 0.1% or lower for light of wavelengths in a wavelength range from 1100 to 5000 nm, have an optical refractive index of 1.40 or higher, and are insulators. "Insulator" in this example refers to a material whose resistivity is the eighth power of 10 ohm meter or higher.

In the coating structure 30, the coating portion 31 and the coating portion 32 may be formed separately, or the coating portion 31 and the coating portion 32 may be formed at the same time. The coating portion 32 is not necessarily needed.

The coating structure 30 at least includes the coating portion 31, and preferably includes the coating portion 32.

For example, the coating structure 30 may be formed in the optical assembly 1 by combining ALD (atomic layer deposition) or CVD (chemical vapor deposition) with photomasking, etching, electron-beam lithography, nanoimprinting, or the like. Compared with a case of forming the coating structure only on the refractive portions 10, good processibility and economy are achieved in the case of coating the surface of the optical assembly 1, including the refractive portions 10 and the optical substrate 20.

A relationship between the structure of the optical assembly 1 and emission light will be described.

The optical assembly 1 has a so-called photonic crystal structure, and can obtain emission light of a wavelength and a wavelength distribution that correspond to the optical structure of the optical assembly 1.

With the optical assembly 1 in this example, the peak wavelength of emission light can be changed by changing the diameter d and the height h of the refractive portions 10, and the period length a of the square grid, for example.

Since the optical assembly 1 in this example further includes the coating structure 30, the optical structure of the optical assembly 1 changes depending on the state of the coating structure 30. Accordingly, the coating thickness t, which is the thickness of the coating portion 31 serving as a coating of the refractive portions 10, of the coating structure 30 also needs to be considered for the diameter d of the refractive portions 10 and the height h of the refractive portions 10.

In the optical assembly 1, emission light propagates in the direction of the height h of the refractive portions 10, along a refractive portion 10 with a higher optical refractive index than that of the surrounding portions, including the optical substrate 20. Then, the light is reflected by an upper end and a lower end of the refractive portion 10, and as a result, standing waves are generated and a resonant state of the light is formed.

This resonance amplifies light of a specific wavelength, which is then emitted as emission light that has a peak at the specific wavelength, to the outside.

Accordingly, the larger the height h, the larger the intensity of emission light of the peak wavelength.

Furthermore, in a case where the optical assembly 1 includes the coating structure 30, in the optical assembly 1, emission light propagates in the direction of the height h of the refractive portions 10 and the coating portion 31, along a refractive portion 10 with a higher optical refractive index than that of surrounding portions, including the optical substrate 20, as well as the coating portion 31. Then, the light is reflected by a lower end of the refractive portion 10 and an upper end of the coating portion 31 that coats an upper end of the refractive portion 10, and as a result, standing waves are generated and a resonance state of light is formed.

This resonance amplifies light of a specific wavelength, which is then emitted as emission light that has a peak with the specific wavelength, to the outside.

Accordingly, the larger the height h and the larger the coating thickness t, the larger the intensity of emission light of the peak wavelength.

The relationship between the peak wavelength of emission light and the diameter d of the refractive portions 10 will now be described in further detail.

The wavelengths of standing waves depend on the height h of the refractive portions 10, and also depend on the diameter d of the refractive portions 10 since the effective refractive index changes if light oozes from the refractive portions 10.

The larger the diameter d, the higher the effective refractive index of the optical assembly 1. Accordingly, the larger the diameter d, the longer the peak wavelength of emission light.

Furthermore, in the case where the coating structure 30 is provided, the effective refractive index of the optical assembly 1 increases in accordance with the thickness of the coating structure 31.

Accordingly, the larger the coating thickness t, the longer the peak wavelength of emission light.

A difference in period length a of the refractive portions 10 affects the resonant wavelength at the heating temperature in terms of a difference in effective refractive index, but not so significantly as a difference in the diameter d of the refractive portions 10 does.

The refractive portions 10 having an excessively short period length a causes a wide range of electromagnetic field distribution overlapped among the refractive portions 10 and interaction thereby occurs, resulting in variation in the resonant wavelength depending on the emission angle of the light.

On the other hand, a period length a that is longer than the wavelength of emission light invokes high-order diffraction, and as a result, emission in one resonant mode is generated in a plurality of directions. Therefore, it is desirable that the period length a is longer than the distance by which the electromagnetic field oozes from each rod and is shorter than the light emission wavelength.

In this example, preferable ranges of the diameter d, height h, period length a, and coating thickness t of the refractive portions 10 are as follows.

A preferable range of the diameter d is from 50 to 300 nm. If the diameter d is too small, the optical assembly 1 will be less durable. Also, the emission intensity of emission light will be too small. If the diameter d is too large, background emission deriving from free electrons on the long-wavelength side will increase.

A preferable range of the height h is from 50 to 1000 nm. The height h is determined in accordance with a desired peak wavelength of emission light.

A preferable range of the period length a is 20 to 1600 nm. An excessively short period length a causes a wide range of electromagnetic field distribution overlapped among the refractive portions 10 and interaction thereby occurs, resulting in variation in the resonant wavelength depending on the emission angle of the light. On the other hand, a period length a that is longer than the wavelength of emission light invokes high-order diffraction, and as a result, emission in one resonant mode is generated in a plurality of directions. Therefore, it is desirable that the period length a is longer than the distance by which the electromagnetic field oozes from each refractive portion 10 and is shorter than the light emission wavelength.

The coating thickness t is in a range from 2 to 200 nm. The coating thickness t is preferably in a range from 10 to 50 nm, and more favorably in a range from 25 to 50 nm. An excessively small coating thickness t will impair the function of protecting the refractive portions 10 and other members from outside, and an excessively large coating thickness t may also make the peak wavelength of emission light too long.

The heat conductive member 90 receives thermal energy supplied to the thermal emission source 100 from the outside, and supplies thermal energy to the optical assembly 1.

In this example, the heat conductive member 90 is in intimate contact with the optical substrate 20 so as to be able to conduct heat. The refractive portions 10 receive thermal energy received by the heat conductive member 90 via the optical substrate 20, and emit emission light. That is to say, the refractive portions 10 convert heat received by the heat conductive member 90 to emission light.

It is favorable that the heat conductive member 90 is made of infrared-transparent glass.

Infrared-transparent glass favorable for the heat conductive member 90 include, for example, MgO, SiC, diamond, sapphire, aluminum nitride, gallium nitride, calcium fluoride, magnesium fluoride, zinc selenide, barium fluoride, and the like. Of these materials, MgO and sapphire are particularly excellent in terms of cost and durability.

The thickness of the heat conductive member 90 is about 10 μm to 3 mm. In this example, the heat conductive member 90 is made of sapphire with a thickness of 0.5 mm. In a case of using SiC, the thickness thereof is approximately 50 μm, for example.

EXAMPLES

The present invention will now be described in more detail while taking examples, but the present invention is not limited to these examples.

In the following examples, the effects of the coating structure 30 will be described while comparing a case where the thermal emission source 100 includes the coating structure 30 with a case where it does not include the coating structure 30.

In the following examples, the thermal emission source 100 has the following configuration, unless stated otherwise. The optical assembly 1 of the thermal emission source 100 includes the refractive portions 10 that are made of Si, which is a semiconductor, and the optical substrate 20 that is made of $SiO_2$, whose optical refractive index is lower than that of the semiconductor of the refractive portions 10. Also, the thermal emission source 100 in this example further includes the heat conductive member 90 that is made of sapphire.

First, effects and deterioration of the coating structure 30 will be described with reference to FIGS. 2 to 5.

Comparative Example 1

Figure 2:
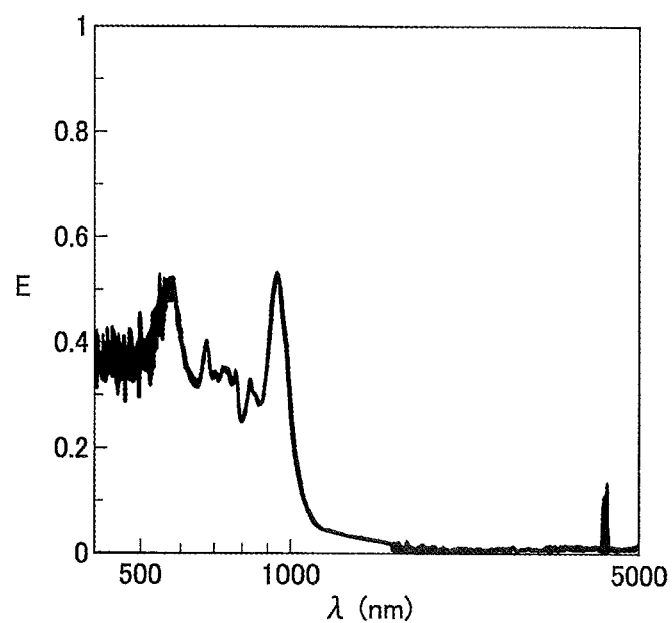
FIG. 2 shows an example of wavelengths and emissivity of the thermal emission source in a case where a coating structure is not provided.

FIG. 2 shows an example of evaluating emission light of the thermal emission source 100 that does not include the coating structure 30. FIG. 2 illustrates a relationship between the emissivity E and the distribution of the wavelength λ of emission light. Hereinafter, in the diagrams, E and λ denote the emissivity and wavelength, respectively, unless stated otherwise.

Conditions and the like for the evaluation example in FIG. 2 will now be described. The temperature of the thermal emission source 100 is 1000° C. The diameter d, height h, and period length a of the refractive portions 10 are 225 nm, 500 nm, and 600 nm, respectively. Since the coating structure 30 is not provided, the coating thickness t is zero.

Figure 3:
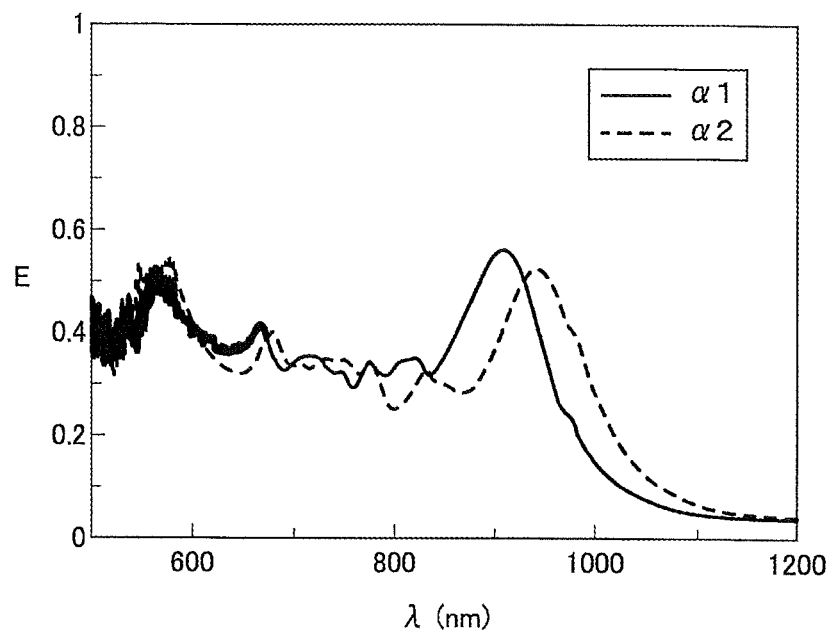
FIG. 3 shows an example of wavelengths and emissivity of the thermal emission source in the case where the coating structure is provided.

FIG. 3 shows an example of evaluating deterioration of the thermal emission source 100 illustrated in FIG. 2. In FIG. 2, α1 denotes a wavelength spectrum of emission light before the thermal emission source 100 deteriorates, in a case where the temperature of the thermal emission source 100 is 1000° C. α2 denotes a wavelength spectrum of emission light after the thermal emission source 100 has deteriorated, in a case where the temperature of the thermal emission source 100 is 1000° C. The deterioration condition is that the thermal emission source 100 is retained at 1100° C. for 30 minutes.

Example 1

Figure 4:
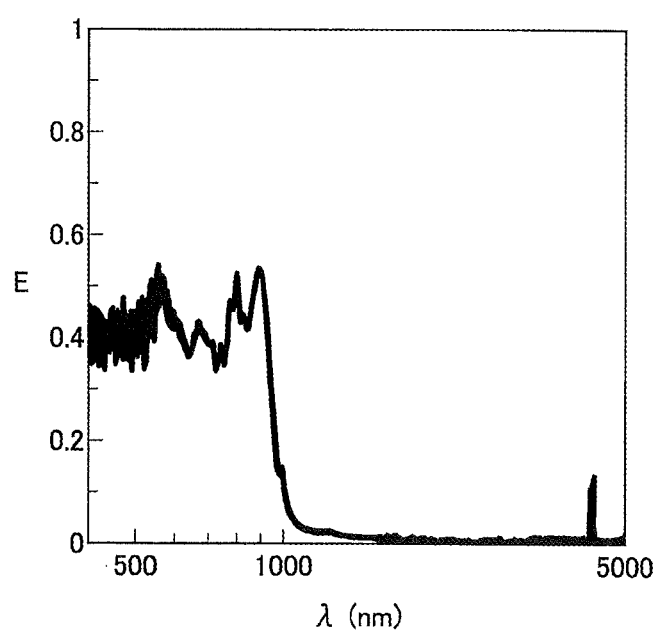
FIG. 4 illustrates an example of a deterioration state of an optical assembly in the case where the coating structure is not provided.

FIG. 4 shows an evaluation example in a case where the thermal emission source 100 includes $HfO_2$, which is an insulator, as the coating material that forms the coating structure 30. FIG. 4 also illustrates a relationship between the emissivity E and the distribution of the wavelength λ of emission light, similarly to FIG. 2.

Conditions and the like for the evaluation example in FIG. 4 will now be described. The temperature of the thermal emission source 100 is 1000° C. The diameter d, height h, and period length a of the refractive portions 10 are 205 nm, 500 nm, and 600 nm, respectively. The coating thickness t of the coating structure 30 is 25 nm.

Figure 5:
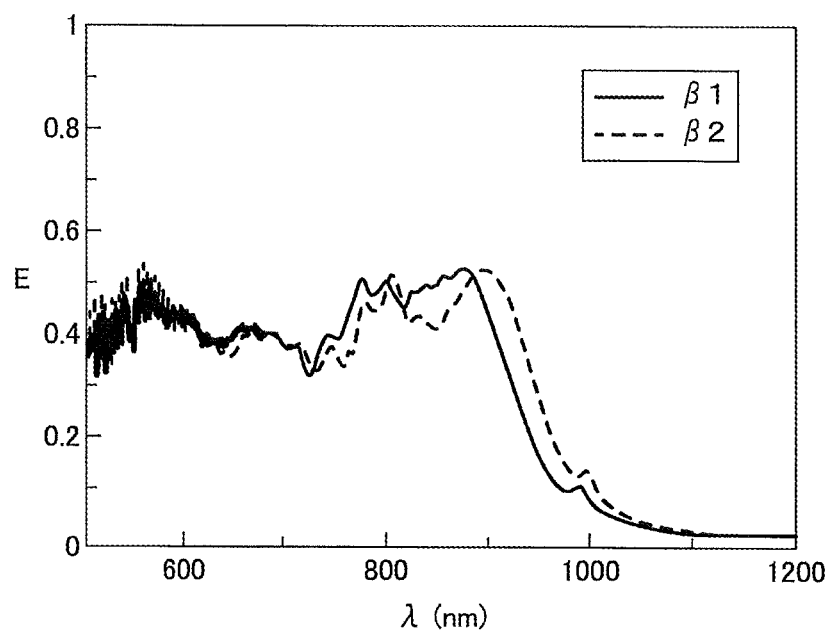
FIG. 5 illustrates an example of a deterioration state of the optical assembly in the case where the coating structure is provided.

FIG. 5 shows an example of evaluating deterioration of the thermal emission source 100 illustrated in FIG. 4. In FIG. 4, β1 denotes a wavelength spectrum of emission light before the thermal emission source 100 deteriorates, in a case where the temperature of the thermal emission source 100 is 1000° C. β2 denotes a wavelength spectrum of emission light after the thermal emission source 100 has deteriorated, in a case where the temperature of the thermal emission source 100 is 1000° C. The deterioration condition is that the thermal emission source 100 is retained at 1100° C. for 30 minutes.

The effects of providing the coating structure 30 can be determined as follows, based on the results in Comparative Example 1 and Example 1.

First, the following evaluation is possible, based on FIGS. 2 and 4.

In both the case where the thermal emission source 100 includes the coating 30 as in Example 1 and the case where it does not include the coating structure 30 as in Comparative Example 1, the thermal emission source 100 has the same characteristics; that is, it emits light of wavelengths of 1100 nm and shorter, and does not emit light in a wavelength region longer than 1100 nm. That is to say, emission light of undesired wavelengths does not increase in both cases.

Also, the following evaluation can be made based on FIGS. 3 and 5.

In both Example 1 and Comparative Example 1, the wavelength spectrum of emission light shifted toward a short-wavelength side after deterioration (α2, β2), compared with that before deterioration (α1, β1).

However, in the case where the thermal emission source 100 includes the coating structure 30 as in Example 1, the variation in the wavelength spectrum before and after deterioration is smaller than in the case where the thermal emission source 100 does not include the coating structure 30 as in Comparative Example 1. That is to say, it can be determined that, in the case where the thermal emission source 100 includes the coating structure 30 as in Example 1, deterioration is suppressed because the refractive portions 10 are protected by the coating structure 30, compared with the case where the thermal emission source 100 does not include the coating structure 30 as in Comparative Example 1. In other words, the thermal emission source 100 has improved durability.

It is assumed that, if the durability increases, background emission on the long-wavelength side relatively decreases when the thermal emission source 100 is used at a higher temperature.

The results in Example 1 and Comparative Example 1 will now be described in further detail.

The diameter d of the refractive portions 10 after deterioration in Comparative Example 1 was 210 nm, which was a decrease by 15 nm from that before deterioration.

The diameter d of the refractive portions 10 after deterioration in Example 1 was 200 nm, which was a decrease by only 5 nm from that before deterioration.

Based on these results as well, it can be determined that, in the case where the thermal emission source 100 includes the coating structure 30 as in Example 1, deterioration is suppressed compared with the case where the thermal emission source 100 does not include the coating structure 30 as in Comparative Example 1.

That is to say, since it is considered that the durability of the thermal emission source 100 improved, it is assumed that background emission on the long-wavelength side relatively decreases when the thermal emission source 100 is used at a higher temperature.

Next, the effects of the coating structure 30 will be described in further detail using FIGS. 6 and 7.

Figure 6:
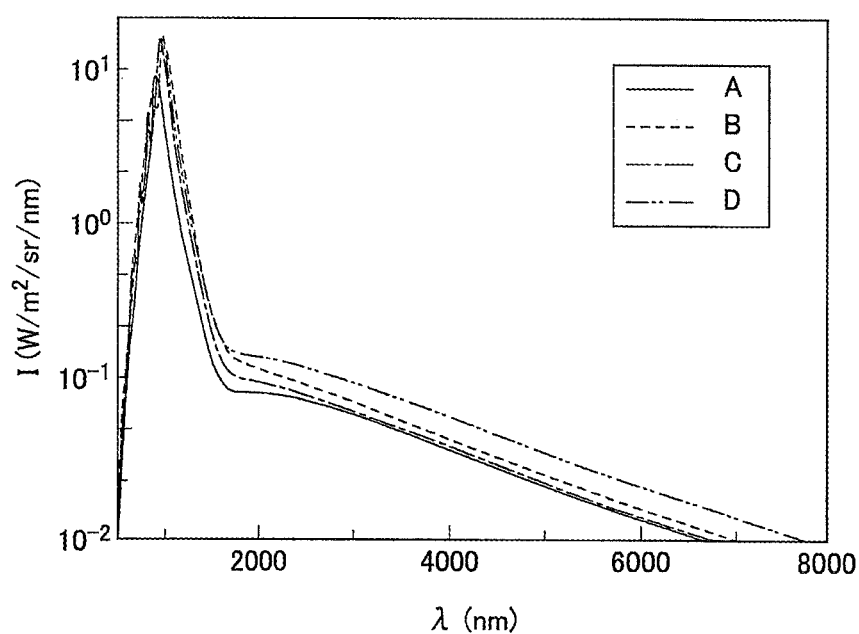
FIG. 6 shows experimental data of the state of the coating structure and a wavelength distribution of emission light.
Figure 7:
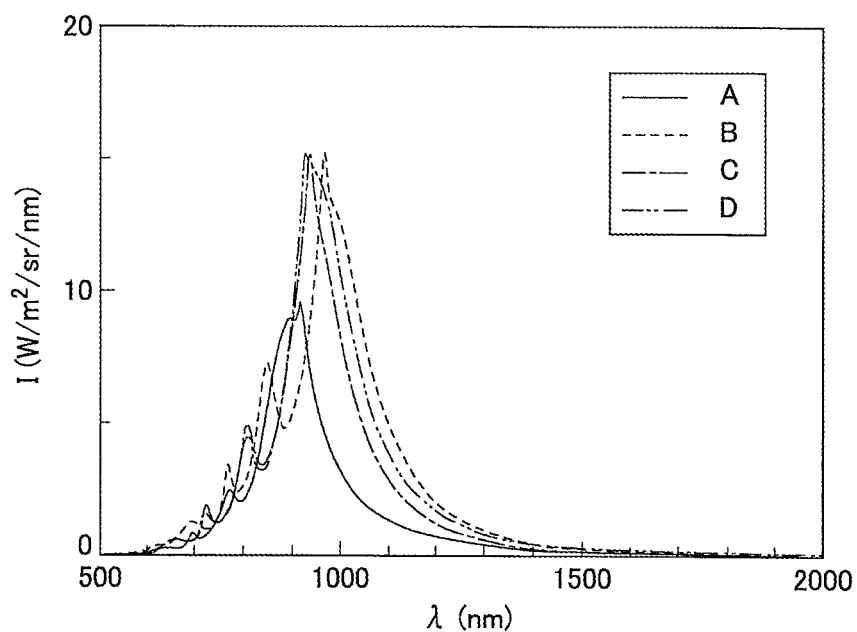
FIG. 7 enlarges the experimental data of the state of the coating structure and the wavelength distribution of emission light.

FIGS. 6 and 7 show an evaluation example illustrating a relationship between the emission intensity I and the wavelength λ when the temperature of the thermal emission source 100 is 1000° C., in the case where the thermal emission source 100 includes the coating structure 30 and in the case where the thermal emission source 100 does not include the coating structure 30.

First, the evaluation example in FIGS. 6 and 7 will be described. A, B, C, and D in FIGS. 6 and 7 correspond to Comparative Example 2, Example 2, Example 3, and Comparative Example 3, respectively. The respective examples will be described below in detail.

Comparative Example 2

A denotes a case where the diameter d, height h, and period length a of the refractive portions 10 are 200 nm, 500 nm, and 600 nm, respectively. Since the coating structure 30 is not provided, the coating thickness t is zero. The peak wavelength of emission light is approximately 920 nm.

Example 2

B denotes a case where the diameter d, height h, and period length a of the refractive portions 10 are 200 nm, 500 nm, and 600 nm, respectively. $HfO_2$ is provided as the coating material for forming the coating structure 30, and the coating thickness t is 50 nm. That is to say, B denotes an example in which the coating structure 30 is thicker than that in the case A in Comparative Example 2. As a result of the coating structure 30 being provided, the peak wavelength of emission light shifts toward the long-wavelength side compared with that in the case A. The peak wavelength of emission light is approximately 970 nm. This is because the effective refractive index of the optical assembly 1 is higher due to the coating thickness t.

Example 3

C denotes a case where the diameter d, height h, and period length a of the refractive portions 10 are 200 nm, 500 nm, and 600 nm, respectively. HfO2, which is an insulator, is provided as the coating material for forming the coating structure 30, and the coating thickness t is 25 nm. That is to say, C denotes an example in which the coating structure 30 is thinner than that in the case B in Example 3.

As a result of the coating structure 30 being provided, the peak wavelength of emission light shifts toward the long-wavelength side compared with that in A. The peak wavelength of emission light is approximately 950 nm. This is because the effective refractive index of the optical assembly 1 is higher due to the coating thickness t. However, the coating thickness t is smaller than that in the case B in Example 2, and thus, the shift amount of peak wavelength of emission light toward the long-wavelength side is slightly smaller.

Comparative Example 3

D denotes a case where the diameter d, height h, and period length a of the refractive portions 10 are 220 nm, 500 nm, and 600 nm, respectively. Since the coating structure 30 is not provided, the coating thickness t is zero.

That is to say, D denotes an example in which the diameter d of the refractive portions 10 is larger than that in the case A in Comparative Example 2.

As a result of increasing the diameter d, the peak wavelength of emission light shifts toward the long-wavelength side compared with that in the case A. The peak wavelength of emission light is approximately 950 nm. This is because the effective refractive index of the optical assembly 1 is higher due to the diameter d. The shift amount of peak wavelength of emission light toward the long-wavelength side is approximately the same as that in the case B in Example 2 and the case C in Example 3. However, the emission intensity I of emission light increased on the long-wavelength side, and the wavelength distribution broadened. Specifically, the intensity of emission light of wavelengths of 1100 nm and higher increased. This seems to be because background emission deriving from free-electron absorption increased.

Comparative Example 2, Example 2, Example 3, and Comparative Example 3 can be evaluated as follows, based on FIGS. 6 and 7.

The peak wavelength of emission light shifts toward the long-wavelength side when the diameter d or the coating thickness t increases.

However, when the peak wavelength is shifted toward the long-wavelength side by approximately the same amount, the wavelength distribution of emission light, including the distribution of long wavelengths, is sharper in the cases (Examples 2 and 3) where the coating structure 30 using a coating material that is $HfO_2$, which is an insulator, than in the case (Comparative Example 3) where the diameter d of the refractive portions 10 that is made of Si, which is a semiconductor, is increased.

Accordingly, as a result of providing the coating structure 30 made of a coating material that is $HfO_2$, which is an insulator, it is possible to reduce the intensity of background emission on the long-wavelength side, which is considered to be derived from free-electron absorption, and to arbitrarily control the peak wavelength to shift the peak wavelength toward the long-wavelength side while keeping a sharp wavelength distribution of emission light, for example.

The results of comparison between Comparative Examples 1 to 3 and Examples 1 to 3 will now be summarized.

The thermal emission source 100 in these examples is restrained from deteriorating and is more durable when including the coating structure 30 made of a coating material that is $HfO_2$, which is infrared-transparent glass and is an insulator, as well as has a higher optical refractive index than that of $SiO_2$ that forms the optical substrate 20, than when not including this coating structure 30. Accordingly, it is assumed that background emission on the long-wavelength side relatively decreases when the thermal emission source 100 is used at a higher temperature.

Also, it is possible to reduce background emission in a long wavelength region that is considered to be deriving from free-electron absorption and obtain a sharp wavelength distribution, the efficiency of converting energy received from the outside to emission light of a desired wavelength peak increases.

If this thermal emission source 100 is used in a light source for a solar cell, for example, a high generating efficiency can be achieved. Also, if this thermal emission source 100 is used in a light source for a sensor, an accurate, power-saving sensor can be obtained.

Example 4

Examples 1 to 3 have described the case where $HfO_2$ is used as the coating structure 30, whereas the same effects as those of Examples 1 to 3 can also be achieved in a case of providing the coating structure 30 made of a coating material that is $Al_2O_3$, which is infrared-transparent glass and is an insulator, as well as has a higher optical refractive index than that of $SiO_2$ that forms the optical substrate 20. The optical refractive index of $Al_2O_3$ is 1.75.

Although a graph of the wavelength distribution of emission light is omitted, if the diameter d, height h, and period length a of the refractive portions 10 is 200 nm, 500 nm, and 600 nm, respectively, and the coating thickness t of $Al_2O_3$ serving as a coating material that forms the coating structure 30 is 50 nm, the peak wavelength of emission light shifted toward the long-wavelength side compared with that in the case A in Comparative Example 2, and the peak wavelength of emission light was approximately 950 nm. This is also because the effective refractive index of the optical assembly 1 was higher due to the coating thickness t.

Needless to say, since the melting point of $Al_2O_3$ is 2072° C., the refractive portions 10 are protected and deterioration is suppressed, also in the case of providing the coating structure 30 made of a coating material that is $Al_2O_3$. Also, needless to say, the heatable temperature increases, and background emission can be suppressed.

Oxidation of the semiconductor and background emissions will now be described in further detail using FIGS. 9 and 10.

Since the thermal emission source 100 in this example suppresses oxidation of semiconductor, the following effects can also be achieved.

When the thermal emission source 100 is used at a high temperature, if the atmosphere when in use thereof contains oxygen, this oxygen oxidizes the semiconductor in the thermal emission source 100. The temperature at which this oxidation begins is the upper limit temperature at which the thermal emission source can be heated. However, if the coating structure 30 is provided, the heatable temperature for the optical assembly 1 increases.

Accordingly, the thermal emission source 100 usually cannot be used at a temperature higher than a predetermined temperature. However, since the thermal emission source 100 in this example has improved durability, it is possible to increase the temperature when in use, suppress background thermal emission, and increase the efficiency of conversion to emission light in a predetermined wavelength region.

Note that, in this example, the efficiency of conversion to emission light in a predetermined wavelength region refers to the ratio of energy of emission light in a desired wavelength range to the overall wavelength range of the emission light of the thermal emission source 100.

Example 5

Figure 9:
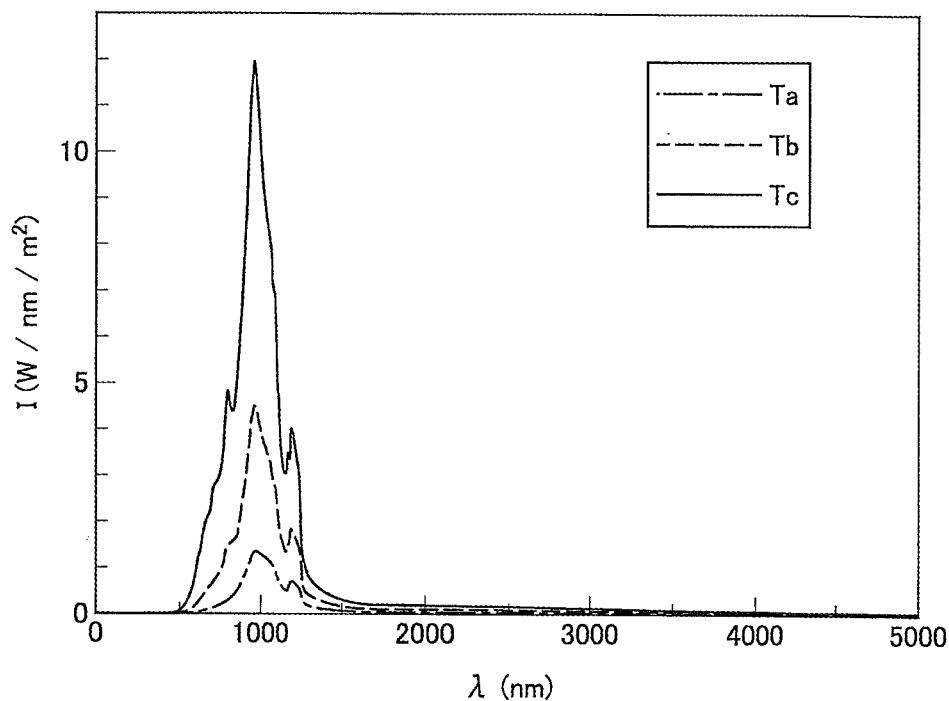
FIG. 9 shows experimental data of the temperature of the thermal emission source, the intensity at a peak wavelength, and a wavelength distribution.

FIG. 9 shows experimental data in an experimental example of the evaluation of the temperature of the thermal emission source 100 in this example and the intensity at the peak wavelength. Also, FIG. 10 shows evaluation data in an example of evaluating the temperature of the thermal emission source 100 in this example and the efficiency of conversion to emission light in a predetermined wavelength region. The signs in FIGS. 9 and 10 and the configuration of the thermal emission source 100 are the same as those in the other example, unless stated otherwise.

In the following example, the diameter d, height h, and period length a of the refractive portions 10 are 200 nm, 500 nm, and 600 nm, respectively. The coating thickness t of the coating structure 30 is 25 nm.

FIG. 9 shows relationships between the wavelength λ of emission light and the emission intensity I at three temperatures.

Ta, Tb, and Tc denote distributions of the intensity of emission light of the thermal emission source 100 at temperatures of 1300 K, 1450 K, and 1600 K, respectively. K represents a unit of absolute temperature, namely the kelvin.

As shown in FIG. 9, the higher the temperature of the thermal emission source 100, the higher the intensity of emission light. Also, the intensity at the peak wavelength of emission light relatively increases more compared with the other wavelength regions, and the wavelength distribution of emission light is sharper.

Figure 10:
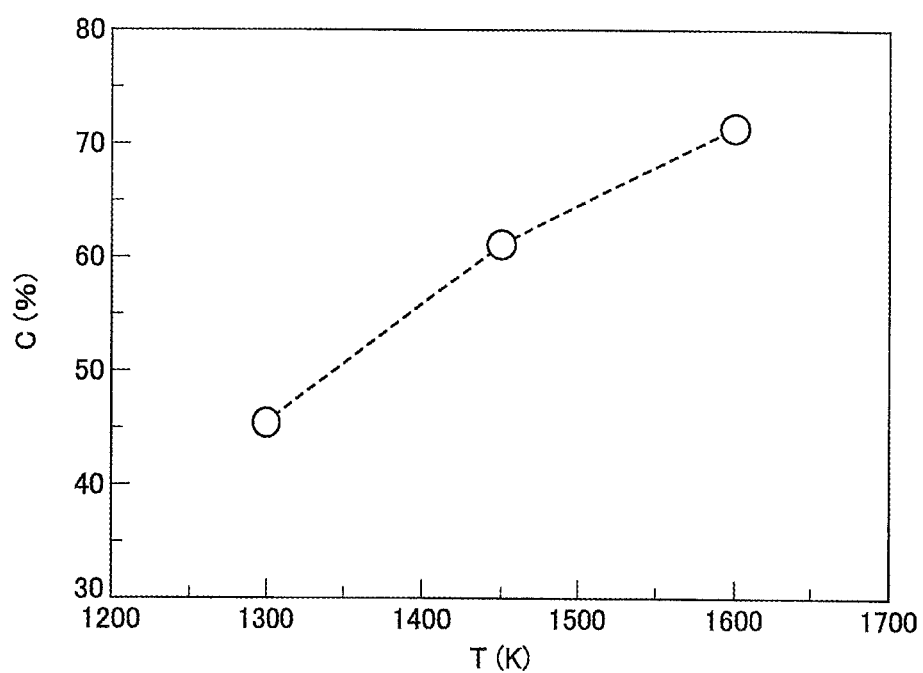
FIG. 10 shows evaluation data of the temperature of the thermal emission source and the efficiency of conversion to emission in a specific wavelength region.

FIG. 10 illustrates evaluation data corresponding to the three evaluations in FIG. 9. FIG. 10 shows the efficiency C of conversion to emission in a wavelength region shorter than 1100 nm for Ta, Tb, and Tc.

It can be understood from FIG. 10 that, the higher the temperature, the higher the value of the conversion efficiency C, and emission light of wavelengths shorter than 1100 nm, which is emission light in a desired wavelength region, out of the overall wavelength region of the emission light of the thermal emission source 100, can be efficiently obtained.

Figure 8:
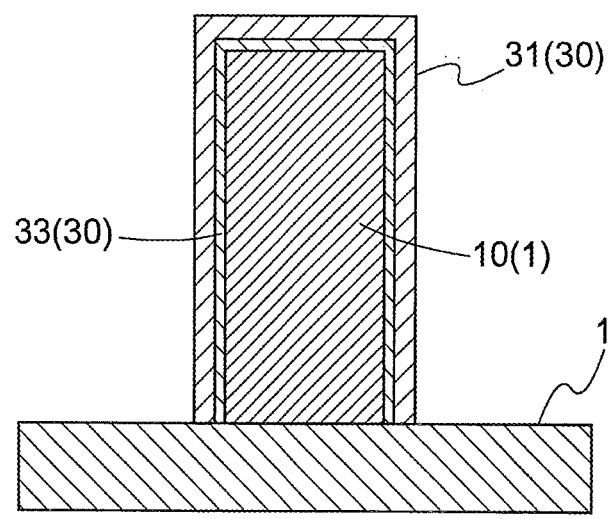
FIG. 8 is a schematic configuration diagram showing a structure of a thermal emission source in a case of a double-layer coating structure.

Other Embodiments (1) The above embodiment has described an example in which the coating structure 30 includes the coating portions that are made of a single-layer coating material, but the coating structure 30 may alternatively include coating portions that are made of a plurality of coating materials with different optical refractive indexes. For example, as shown in FIG. 8, the coating structure 30 covering the refractive portions 10 may also include the coating portion 31 and a second coating portion 33, which has an optical refractive index different from that of the coating portion 31.

In this case, a combination of the materials is preferable in which the optical refractive index of the material of the second coating portion 33 is smaller than that of the coating portion 31. In the case of FIG. 8, it is favorable to use sapphire as the second coating portion 33 if the coating portion 31 is made of $HfO_2$, for example.

This configuration can suppress background emission on the long-wavelength side of the emission light, prevent the wavelength distribution from broadening, and keep a sharp wavelength distribution of emission light.

Also, the coating structure 30 may include coating portions that are made of a plurality of materials with different melting points. In particular, a combination of the materials is favorable in which the melting point of the material of the second coating portion 33 is higher than the melting point of the material of the coating portion 31. This configuration can suppress oxidation of the semiconductor.

In the case of FIG. 8, sapphire is favorably used as the second coating portion 33 if the coating portion 31 is made of $HfO_2$, for example. The melting point of $HfO_2$ is 2758° C., and the melting point of sapphire, which is $Al_2O_3$, is 2072° C. The coating structure 30 is more durable when the melting point of the surface layer (coating portion 31) of the coating structure 30 is higher. The binding force in the interface between the semiconductor in the refractive portions 10 and the coating structure 30 increases when the melting point of the inner layer (second coating portion 33) of the coating structure 30 is relatively lower than that of the surface layer (coating portion 31). Thus, the refractive portions 10 and the coating structure 30 work as one structure, and a higher strength can be obtained. That is to say, the coating structure 30 is formed as a so-called functional gradient material.

In particular, when Si is used as the semiconductor, use of sapphire can suppress reaction between $HfO_2$ and Si. "Reaction" refers to oxidation of Si due to oxygen contained in $HfO_2$, compatibility between $HfO_2$ and Si, and solid state diffusion.

When the coating structure 30 is constituted by the coating portion 31 and the second coating portion 33 with an optical refractive index different from that of the coating portion 31, and the coating material that forms the second coating portion 33 is an oxide, it is preferable that standard Gibbs energy of the element before this oxide is oxidized (that is to say, the element is obtained by reducing the oxide) is smaller than the standard Gibbs energy of the coating material of the coating portion 31. In this example, the standard Gibbs energy of the oxide at a temperature in a range from 0° C. to 1500° C. is used.

This choice of the coating material of the second coating portion 33 makes it possible to suppress oxidation of the semiconductor, and suppress deterioration of the optical assembly 1 over time. The coating structure 30 is not limited to a double-layer structure such as that described above, and may alternatively be a multi-layer structure with three or more layers.

(2) The above embodiment has described that the peak wavelength of emission light is determined by the diameter d, height h, period length a, and coating thickness t.

In the above embodiment, the optical structure of the optical assembly 1 is determined by determining the diameter d, height h, and period length a at first. Meanwhile, in a case of finely adjusting the peak wavelength of emission light to shift it toward the long-wavelength side, the coating thickness t of the coating structure 30 can be increased to shift the peak wavelength of emission light toward the long-wavelength side. In other words, to shift the peak wavelength of emission light toward the long-wavelength side, it is also possible to provide the coating structure 30, adjust the coating thickness t, and obtain emission light of a desired peak wavelength.

As shown in FIGS. 6 and 7, in the case of shifting the peak wavelength of emission light toward the long-wavelength side in a range up to approximately 200 nm, the wavelength distribution on the long-wavelength side does not broaden compared with the case of adjusting the diameter d, and a sharp wavelength distribution can be kept with which the emission amount is small in a wide area of a wavelength region longer than the wavelength that corresponds to the absorption edge corresponding to the semiconductor band gap, and background thermal emission is suppressed.

(3) The above embodiment has described the case where the surface of the optical assembly 1 is coated by an integrated coating structure 30, but the coating portion 31 and the coating portion 32 of the coating structure 30 may be formed separately. The coating structure 30 may only include particularly the coating portion 31 for coating the refractive portions 10.

(4) The above embodiment has described the case where the surface of the optical assembly 1 is coated with an integrated coating structure 30, but the coating portion 31 and the coating portion 32 of the coating structure 30 may be formed separately. The coating structure 30 may only include particularly the coating portion 31 for coating the refractive portions 10.

(5) The above embodiment has described the case of a single-layer, two-dimensional optical assembly 1 that includes one optical substrate 20 and the refractive portions 10, but the optical assembly 1 may alternatively be a three-dimensional optical assembly 1 that includes a plurality of optical substrates 20, each being provided with the refractive portions 10.

(6) The above embodiment has described the case where the thickness of the coating structure 30 is the coating thickness t, but the coating structure 30 may alternatively be formed so that a coating thickness t31, which is the thickness of the coating portion 31, and a coating thickness t32, which is the thickness of the coating portion 32, are different.

INDUSTRIAL APPLICABILITY

The present invention can be effectively used as a light source for thermophotovoltaic generation and for high-efficient sensing.

DESCRIPTION OF REFERENCE SIGNS

1: Optical assembly
10: Refractive portion (member)
20: Optical substrate
30: Coating structure
31: Coating portion
32: Coating portion
33: Second coating portion
100: Thermal emission source

The invention claimed is:

1. A thermal emission source comprising:
an optical assembly having an optical structure in which a member made of a semiconductor has a refractive index distribution so as to resonate with light of a wavelength shorter than a wavelength that corresponds to an absorption edge corresponding to a band gap of the semiconductor,
wherein the optical assembly comprises a coating structure for coating the member made of the semiconductor with a coating material through which light of a wavelength included in a wavelength range from visible light to far infrared rays can be transmitted,
an infrared absorptivity of the coating structure is 0.1% or lower, and
the coating material is selected from the group consisting of $HfO_2$, $MgO$, $Al_2O_3$, $Y_2O_3$, and $CaF_2$.

2. The thermal emission source according to claim 1, wherein the coating material is an insulator.

3. The thermal emission source according to claim 2, wherein the optical assembly has a photonic crystal structure in which a refractive portion that is formed with the member is arranged on an optical substrate whose optical refractive index is smaller than that of the semiconductor.

4. The thermal emission source according to claim 3, wherein light of a wavelength included in a wavelength range from visible light to far infrared rays can be transmitted through the optical substrate.

5. The thermal emission source according to claim 3, wherein an optical refractive index of the coating material is higher than the optical refractive index of the optical substrate.

6. The thermal emission source according to claim 3, wherein the optical assembly includes a coating structure for coating the optical substrate with a coating material through which light of a wavelength included in a wavelength range from visible light to far infrared rays can be transmitted.

7. The thermal emission source according to claim 3, wherein the coating structure is a multi-layer structure including coating materials having different optical refractive indexes.

8. The thermal emission source according to claim 3, wherein the coating material has a melting point higher than the melting point of the semiconductor.

9. The thermal emission source according to claim 3, wherein the semiconductor is Si, and a peak wavelength of emission light is 1800 nm or shorter.

10. The thermal emission source according to claim 3, wherein the semiconductor is SiC, and a peak wavelength of emission light is 1100 nm or shorter.

* * * * *